United States Patent
Christensen et al.

(10) Patent No.: US 10,093,412 B2
(45) Date of Patent: Oct. 9, 2018

(54) PNEUMATIC TAXI SYSTEM

(71) Applicant: HONEYWELL INTERNATIONAL INC., Morris Plains, NJ (US)

(72) Inventors: Donald Jeffrey Christensen, Phoenix, AZ (US); Steve Able, Chandler, AZ (US); Daniel C. Birchak, Gilbert, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 141 days.

(21) Appl. No.: 14/927,931

(22) Filed: Oct. 30, 2015

(65) Prior Publication Data

US 2017/0121013 A1    May 4, 2017

(51) Int. Cl.
*B64C 25/40* (2006.01)
*B64C 25/42* (2006.01)

(52) U.S. Cl.
CPC ............ *B64C 25/405* (2013.01); *B64C 25/42* (2013.01)

(58) Field of Classification Search
CPC ................................. B64C 25/405; B64C 25/42
See application file for complete search history.

(56) References Cited

U.S. PATENT DOCUMENTS

| | | |
|---|---|---|
| 3,893,538 A * | 7/1975 | Thompson ............ B60V 3/025 104/23.2 |
| 8,474,749 B2 | 7/2013 | Cros et al. |
| 8,684,299 B2 | 4/2014 | Bulin et al. |
| 8,820,675 B2 | 9/2014 | Cox et al. |
| 9,096,315 B2 | 8/2015 | Seibt |
| 2005/0129561 A1* | 6/2005 | Heizer ...................... F01C 1/00 418/191 |
| 2013/0200209 A1 | 8/2013 | Goldman et al. |
| 2014/0284421 A1* | 9/2014 | Osman .................. B64C 25/405 244/50 |
| 2015/0158579 A1* | 6/2015 | Cox ...................... B64C 25/405 244/50 |
| 2015/0253773 A1* | 9/2015 | Cox ...................... G05D 1/0083 701/3 |
| 2016/0016658 A1* | 1/2016 | Walitzki ................ B64C 25/405 244/50 |

* cited by examiner

*Primary Examiner* — Valentina Xavier
(74) *Attorney, Agent, or Firm* — Shimokaji IP

(57) ABSTRACT

A pneumatic taxi system of an aircraft with a rotary non-turbine air motor for driving a wheel, of an aircraft landing gear, with compressed air.

8 Claims, 5 Drawing Sheets

PNEUMATIC TAXI SYSTEM

BACKGROUND OF THE INVENTION

The present invention generally relates to apparatus and methods for replacing large and heavy elements in aircraft landing gear and taxi systems.

Aircraft systems typically are constrained by weight and size. Landing gear (LG) systems are no exception to this. LG systems, in fact, are a particular concern, since they are only used when aircraft are on the ground and to taxi the aircraft. The LG and undercarriage are a relatively heavy part; being as much as 7% of the takeoff weight, but more typically 4-5%.

Electrical, hydraulic and air turbine solutions for landing gear systems have been considered. For instance, electrical solutions are most common today. These require a high power traction electrical motor and gear box at the LG, as well as an electric generator for conversion and conditioning of the necessary electric power, powered by the aircraft's auxiliary power unit (APU). In addition to weight, the large, heavy electronic portion of the system occupies valuable space in the cargo bay.

Granted, many aircraft have APU driven electrical generators for other purposes, but adding weight for the electrical motor and gear box in the LG, copper electrical cable to the LG, and other considerations like upsizing the generator to handle additional electrical and thermal loads must be considered.

Hydraulic motors in LG systems have similar added weight and complexity concerns. And air turbine solutions require high velocity air flow, requiring a special APU driven compressor and routing the high pressure air to the LG. In sum, weight and size for existing solutions and their ancillary concerns remain challenges.

As can be seen, there is a need for replacing large and heavy elements in aircraft landing gear and taxi systems.

SUMMARY OF THE INVENTION

In one aspect, a pneumatic taxi system of an aircraft is provided, comprising a rotary non-turbine air motor for driving a wheel, of an aircraft landing gear, with compressed air.

In another aspect, a pneumatic taxi system is provided, comprising a rotary non-turbine air motor for driving a wheel, of an aircraft landing gear, with compressed air. A directional control valve for changing the direction of rotation of the said air motor and thus the direction of taxiing of the aircraft. And a brake to slow or stop taxiing of the aircraft.

In a further aspect, a method of taxiing an aircraft having an auxiliary power unit is provided, comprising providing a non-turbine air motor at a wheel of the aircraft and providing compressed air from the auxiliary power unit to said air motor.

These and other features, aspects and advantages of the present invention will become better understood with reference to the following drawings, description and claims.

BRIEF DESCRIPTION OF THE DRAWINGS

FIG. 1a is a partial cross-section taken along A-A in FIG. 1;

DETAILED DESCRIPTION OF THE INVENTION

The following detailed description is of the best currently contemplated modes of carrying out exemplary embodiments. The description is not to be taken in a limiting sense, but is made merely for the purpose of illustrating the general principles, since the scope of the embodiments is best defined by the appended claims.

Various inventive features are described below that can each be used independently of one another or in combination with other features. Broadly, exemplary embodiments provide apparatus and methods for an improved aircraft landing gear.

Figure 1:
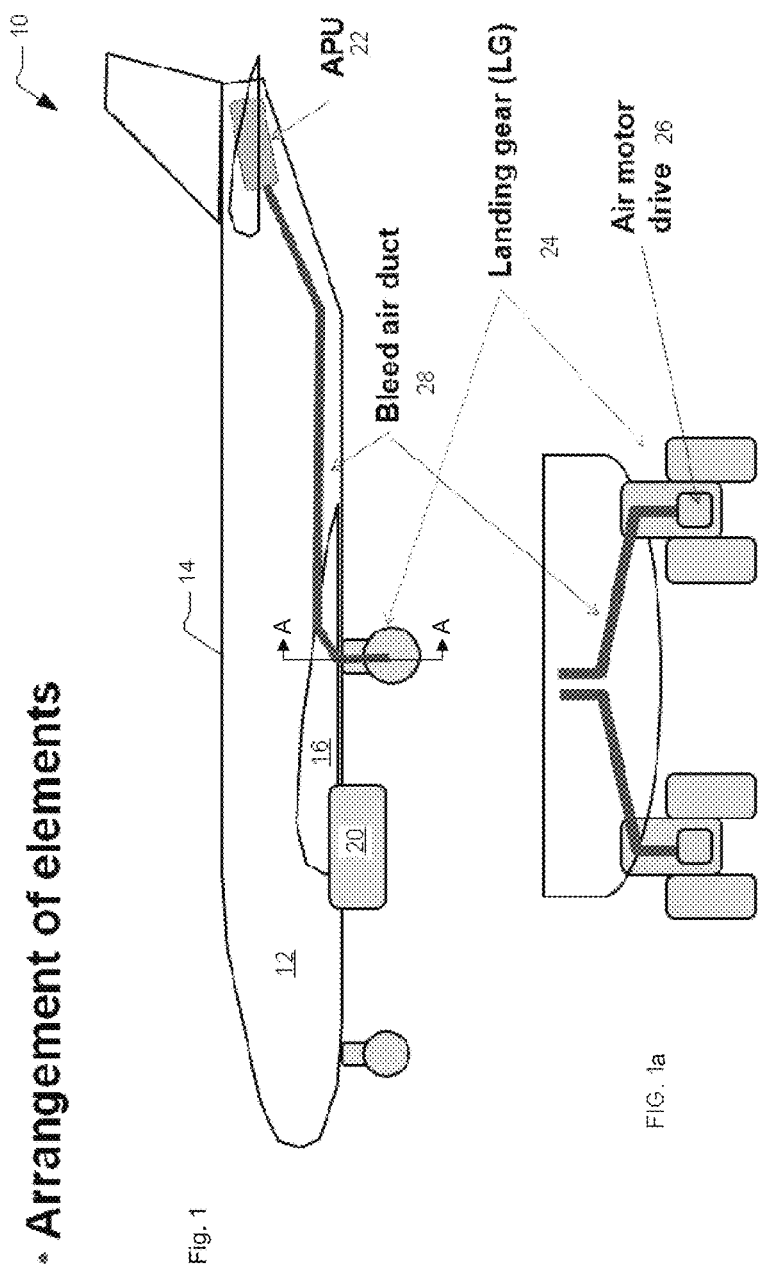
FIG. 1 is a schematic block diagram of a pneumatic taxi system according to an exemplary embodiment of the present invention.

FIG. 1 is a schematic block diagram of a pneumatic taxi system 10 according to an exemplary embodiment of the present invention, and FIG. 1a is a partial cross section taken along A-A in FIG. 1. The system 10 may be implemented in a conventional aircraft 12 that has a body 14, wings 16, aircraft engines 20, an auxiliary power unit 22 (APU), and landing gears 24 (LGs) (front and rear).

An air motor 26 is shown on each of the rear LGs 24. Unlike the electrical cable of conventional electric motors, the air motors 26 can be powered, via bleed air ducts 28, from the APU 22. This arrangement can allow for use of otherwise existing equipment at the LG 24. The air duct 28 would need to be added, just as the electric cable would but the electric cable would be heavier and more expensive.

A pneumatic motor (air motor) or compressed air engine is a type of motor which does mechanical work by expanding compressed air. An air motor is different from a turbine, a rotary mechanical device that extracts energy from a fluid flow and converts it into useful work.

Continuing with FIG. 1, bleed air duct 28 can run from the APU 22, to the starter of each aircraft engine 20, and to the wheel actuator of the LG 24[,]. A standard valve (e.g., FIG. 2 valve 41) can be used to start/stop the air flow to the air motors 26. A valve (e.g., FIG. 2, valve 36) can be used to control the amount and direction of rotation of the air motors 26.

Figure 2:
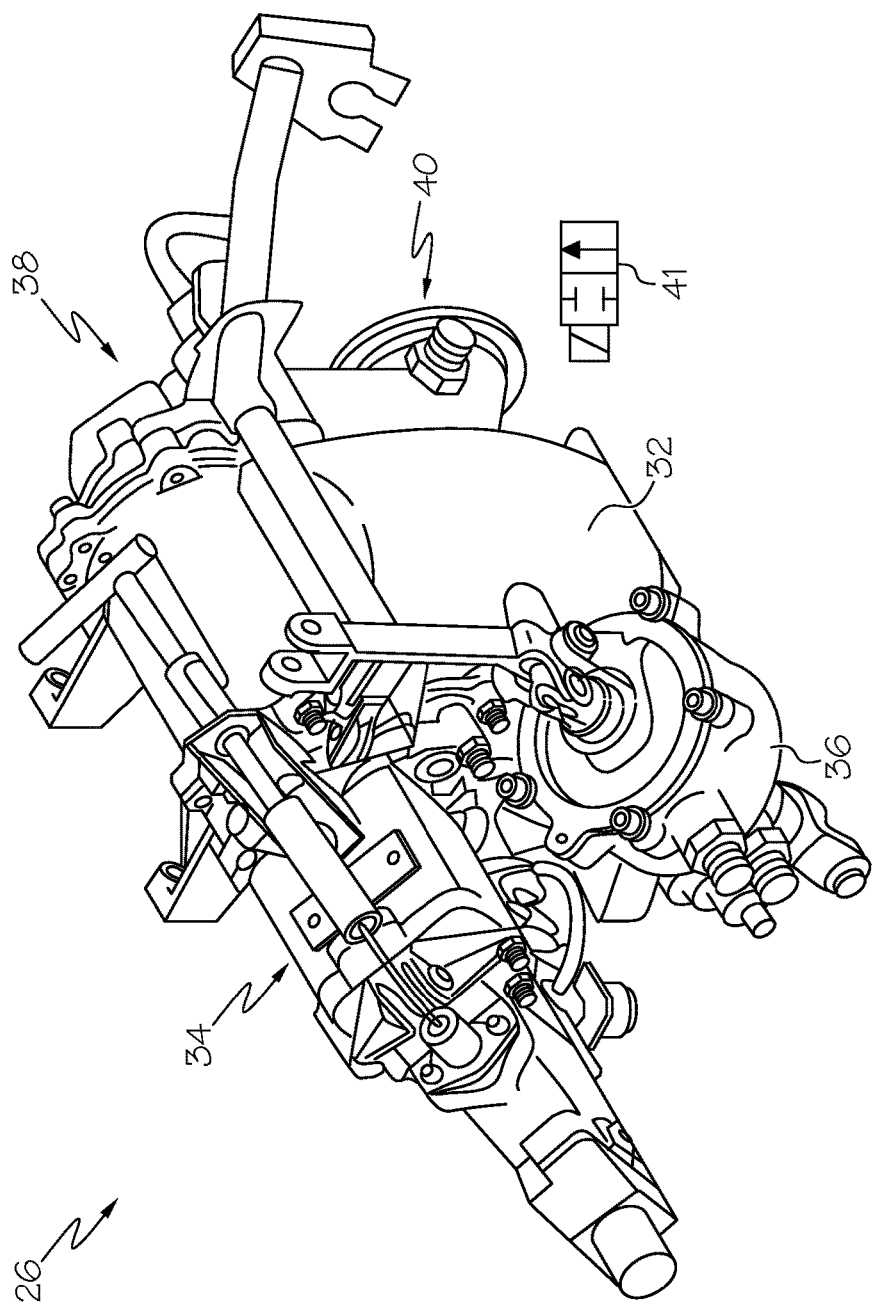
FIG. 2 is a perspective view an air motor that may be employed according to an exemplary embodiment of the present invention.

FIG. 2 depicts an air motor 26 that may be adapted for use in the taxi system 10. The air motor 26 can have a pneumatic drive unit 32, a rotary directional control valve 36 to reverse the movement produced by the air motor 26, a drive output 38 where the air motor 26 attaches to a gearbox (not shown) used to drive the LG 24, and a supply inlet 40.

FIG. 2 shows an air motor 26 in a thrust reverser format (different from air turbines which require higher air pressures and fluid flow).

The air motor 26, driven by the APU 22, can package well, can be a large weight savings, and can deliver the necessary performance. The size, cost and weight of the equipment in the aircraft cargo bay can also be greatly reduced enabling an overall lighter taxi system.

The power for the taxi system 10 can come from the APU 20. The conventional conversion from the gas horsepower to electric power has efficiency losses associated with it. These losses show up as unwanted heat that needs to be managed away. Air motors 26 can be well suited to efficiently utilize the pneumatic power generated by a turbine engine.

A lesser size air motor 26 can provide the same amount of power as a larger electric motor, and they do not require an auxiliary speed controller (adding to compactness) while providing steplessly adjustable power output. In an air motor 26, torque can increase while load and power is relatively constant over range. Air motors 26 typically are undamaged by overloads or by stalling, and can be stopped and started without overloading. Air motors 26 can be reversed, providing full efficiency in both forward and reverse. Air motors 26 can be ideal in hazardous and power output hostile environments, creating no sparks or electromagnetic interference. Air motors 26 can be rugged, being unaffected by heat vibration or water or locks and loads. Air motors 26 can be easy to install and simpler construction than other types of motors; operate in any orientation and have fewer moving parts and are less likely to fail than other types of motors.

Figure 3:
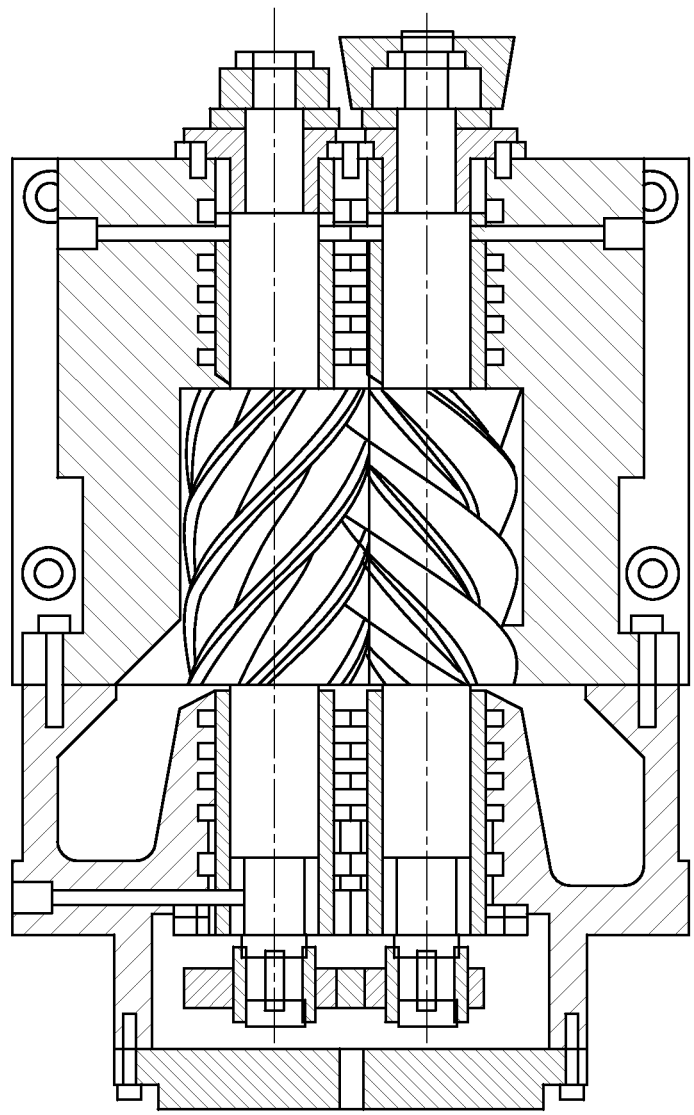
FIG. 3 shows a screw compressor that may be employed according to an exemplary embodiment of the present invention.
Figure 4:
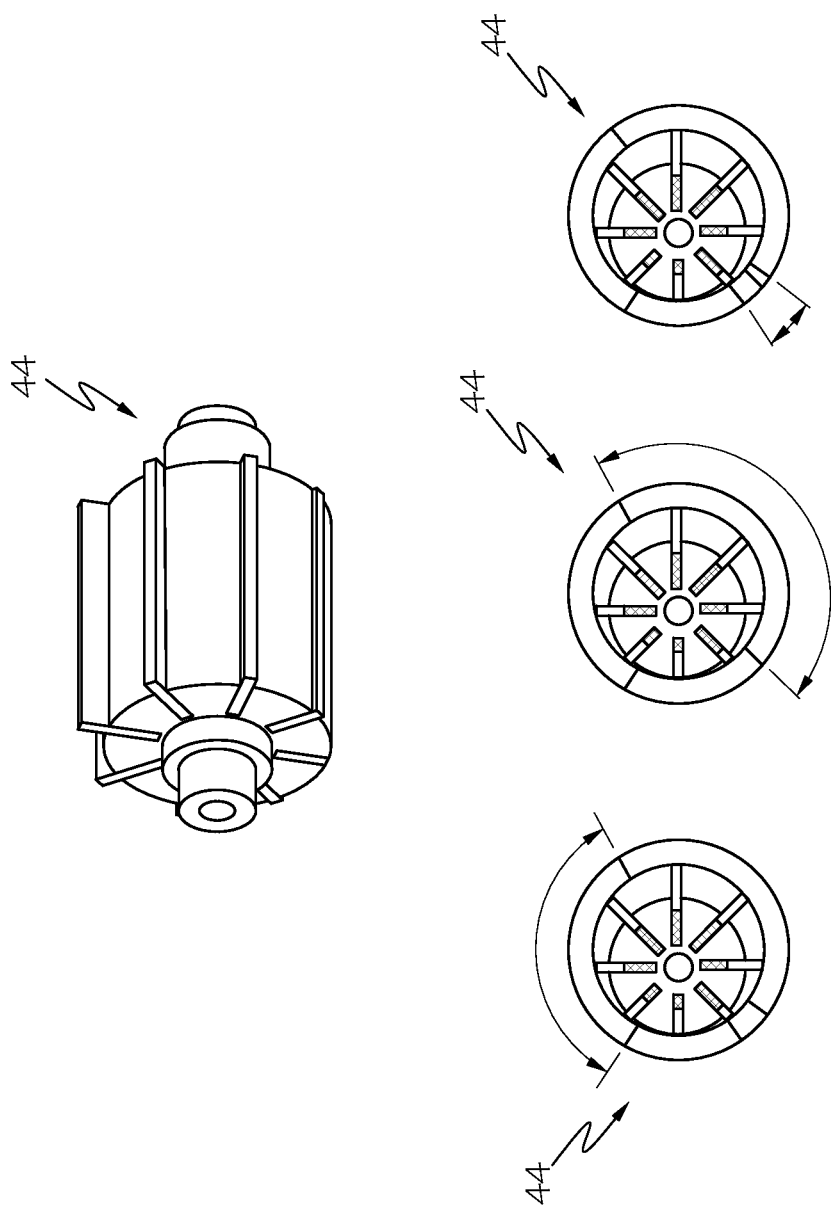
FIG. 4 shows a vane compressor that may be employed according to an exemplary embodiment of the present invention.
Figure 5:
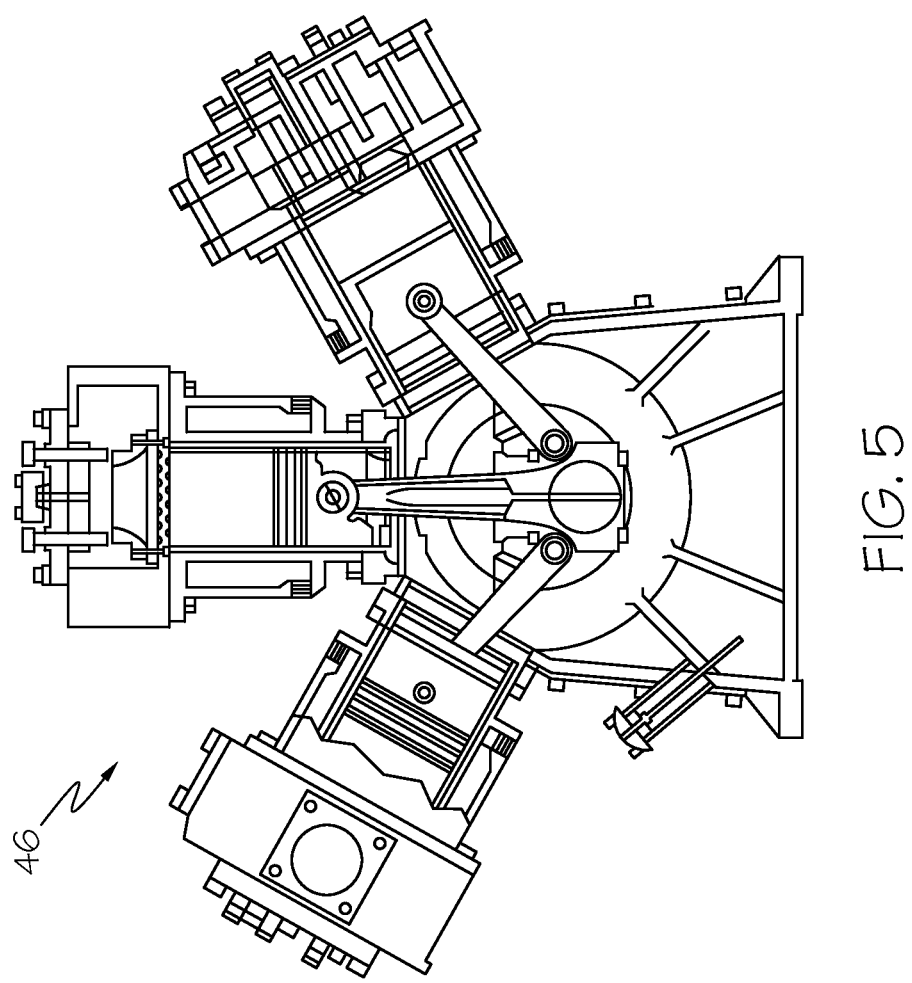
FIG. 5 shows a piston air compressor that may be employed according to an exemplary embodiment of the present invention.

FIGS. 3-5 show a screw air compressor 42, a vane air compressor 44, and a piston air compressor 46 that are suitable for use as an air motor 26. If one applies air pressure to the rotors of a suitable rotary compressor it can become an air motor 26 and the output shaft can deliver torque/power.

The rotary screw compressor 42 in FIG. 3 is a common example of a "screw rotor" type of machine that can be driven as an air motor 26. Consider its use as a compressor. The compression action takes place in an airend formed by the interlocking of two rotors within a casing. The structure of the airend is shown in FIG. 3. While the main rotor is driven by direct coupling through belt-wheel mechanisms, the supplementary rotor serves only to ensure the impermeability of the work chamber during the suction and compression phases.

The operating principle of the airend can be explained in four phases. In the first phase, air is taken from the suction nozzle in the compression chamber. Outer cavities fill with air. In the second and third phases, rotors turning in counter directions shut off the suction nozzle, creating an area of compression between the casing and the rotor cavities. Air moves along the rotor cavities, within the volume that is created constantly decreasing due to the counter rotation of the rotors. In the fourth phase, compressed air is discharged from the airend outlet.

Thus, reversing the action of the screw compressor 42, the screw air motor works from the expansion action that takes place in an airend formed by the interlocking of two rotors within a casing. The structure of the airend is the same, and is again shown in FIG. 3. While the main rotor drives by direct coupling through belt-wheel mechanisms, the supplementary rotor serves only to ensure the impermeability of the work chamber during the pressure and expansion phases.

In the first phase, air is taken from an external pressure source. Outer cavities fill with this air. In the second and third phases, rotors turning in counter directions shut off the pressure source, creating an area of expansion between the casing and the rotor cavities. Air moves along the rotor cavities, within the volume that is created constantly increasing due to (driving) the counter rotation of the rotors. In the fourth phase, expanded air is discharged from the airend outlet.

The rotary vane type compressor 44 in FIG. 4 is an example of another machine that can be driven as an air motor 26. And the piston type air compressors 46 of FIG. 5 is a common example of a piston machine that can be driven as an air motor 26. As can be seen, vane type air motors are relatively simple mechanically, whereas piston type air motors have many of the parts of piston combustion engines and thus tend to be more complex mechanically.

It should be understood, of course, that the foregoing relate to exemplary embodiments of the invention and that modifications may be made without departing from the spirit and scope of the invention as set forth in the following claims.

We claim:

1. A pneumatic taxi system of an aircraft, comprising:
a bleed air duct that runs from an auxiliary power unit to a starter of an aircraft engine, and to a wheel actuator of a landing gear,
the wheel actuator including;
a rotary non-turbine air motor for driving at least one wheel of the aircraft landing gear, with a compressed air supply, wherein the air motor includes a main rotor and a supplementary rotor, the air motor configured to be disposed to a side of the at least one wheel, within a region defined by a circumference of the at least one wheel, when the landing gear is extended and in contact with a taxiing surface;
a first valve disposed between the bleed air duct and the air motor to start and stop the compressed air supply to the air motor; wherein
the main rotor is configured to drive the wheel.

2. The pneumatic taxi system of claim 1, wherein said air motor is of a screw type.

3. A pneumatic taxi system, comprising:
a rotary non-turbine air motor for driving at least one wheel of an aircraft landing gear, with compressed air, wherein the air motor includes a rotor driven by direct coupling to a belt-wheel mechanism, and the air motor includes a supplementary rotor, the air motor is configured to be disposed between a side surface of the at least one wheel and a side surface of an adjacent wheel of the landing gear, the side surfaces being perpendicular to wheel surfaces that contact a taxiing surface;
a directional control valve for changing the direction of rotation of the air motor and thus the direction of taxiing of the aircraft;
a second valve configured to start and/or stop air flow to the air motor; and
a brake to slow or stop taxiing of the aircraft.

4. The pneumatic taxi system of claim 3, wherein said air motor is a screw type.

5. The pneumatic taxi system of claim 3, wherein the aircraft includes an auxiliary power unit and providing the compressed air to the air motor from the auxiliary power unit.

6. The pneumatic taxi system of claim 5, wherein said compressed air is provided via an air line from the auxiliary power unit to an engine of the aircraft.

7. A method of taxiing an aircraft having an auxiliary power unit, comprising:
providing compressed air from the auxiliary power unit via a bleed air duct to an engine starter and to a non-turbine air motor;
providing the air motor at a wheel of the aircraft wherein the air motor includes a main rotor and a supplementary rotor, wherein the supplementary rotor is configured to operate only during a suction phase and a compression phase, the air motor being configured to be disposed to a side of the wheel, within a region defined by a circumference of the wheel, when the aircraft is taxiing;

starting and stopping a supply of compressed air from the bleed air duct to the air motor by operation of a first valve;

driving the wheel with the main rotor via a direct coupling; and controlling an amount and direction of rotation of the air motor by operation of a second valve.

8. The method of claim 7, wherein said air motor is of a screw type.

* * * * *